(12) United States Patent
Orhan et al.

(10) Patent No.: US 11,748,568 B1
(45) Date of Patent: Sep. 5, 2023

(54) MACHINE LEARNING-BASED SELECTION OF METRICS FOR ANOMALY DETECTION

(71) Applicant: Amazon Technologies, Inc., Seattle, WA (US)

(72) Inventors: Umut Orhan, Seattle, WA (US); Harshad Vasant Kulkarni, Bellevue, WA (US); Jasmeet Chhabra, Sammamish, WA (US); Vikas Dharia, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 16/988,153

(22) Filed: Aug. 7, 2020

(51) Int. Cl.
*G06F 40/289* (2020.01)
*G06F 40/284* (2020.01)
*H04L 41/16* (2022.01)
*H04L 43/16* (2022.01)
*H04L 43/024* (2022.01)

(52) U.S. Cl.
CPC ............ *G06F 40/284* (2020.01); *H04L 41/16* (2013.01); *H04L 43/16* (2013.01); *H04L 43/024* (2013.01)

(58) Field of Classification Search
None
See application file for complete search history.

(56) References Cited

U.S. PATENT DOCUMENTS

| | | | |
|---|---|---|---|
| 8,931,101 B2 | 1/2015 | Baluda et al. | |
| 9,483,049 B2 | 11/2016 | Maeda et al. | |
| 9,652,354 B2 | 5/2017 | Filimonov et al. | |
| 10,103,960 B2 | 10/2018 | Boubez | |
| 10,223,403 B2 | 3/2019 | Malhotra et al. | |
| 10,270,788 B2 | 4/2019 | Faigon et al. | |
| 2015/0379429 A1* | 12/2015 | Lee ......................... | G09B 5/00 706/11 |
| 2017/0279838 A1 | 9/2017 | Dasgupta et al. | |
| 2020/0067948 A1 | 2/2020 | Baradaran et al. | |
| 2021/0174258 A1* | 6/2021 | Wenchel ................ | G06N 20/00 |

OTHER PUBLICATIONS

Alec Radford et al, "Better Language Models and Their Implications", dated Feb. 14, 2019, pp. 1-17.
Unknown, "Creating a CloudWatch Alarm Based on Anomaly Detection", pp. 1-4.
Unknown, "Getting Statistics for a Specific Resource", pp. 1-6.
Unknown, "Publishing Custom Metrics", pp. 1-4.

* cited by examiner

*Primary Examiner* — June Sison
(74) *Attorney, Agent, or Firm* — Robert C. Kowert; Kowert, Hood, Munyon, Rankin & Goetzel, P.C.

(57) ABSTRACT

A plurality of metrics records, including some records indicating metrics for which anomaly analysis has been performed, is obtained. Using a training data set which includes the metrics records, a machine learning model is trained to predict an anomaly analysis relevance score for an input record which indicates a metric name. Collection of a particular metric of an application is initiated based at least in part on an anomaly analysis relevance score obtained for the particular metric using a trained version of the model.

20 Claims, 9 Drawing Sheets

US 11,748,568 B1

MACHINE LEARNING-BASED SELECTION OF METRICS FOR ANOMALY DETECTION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines or compute instances hosted by the single virtualization host. Each such compute instance may represent a software simulation acting as a distinct logical computing system that provides users with the illusion that they are the sole operators of a given hardware computing resource, while also providing application isolation and security among the various compute instances.

Many sophisticated applications are run using resources of several different services of a provider network or cloud computing environment, including for example a virtualized computing service, one or more storage services and so on. Large applications may often run on dozens or hundreds of compute instances and use resources of several different other services, and their workloads may vary substantially over time. Ensuring that the applications continue to meet desired levels of performance in the presence of changing workloads and large resource bases remains a non-trivial technical problem.

Figure 1:
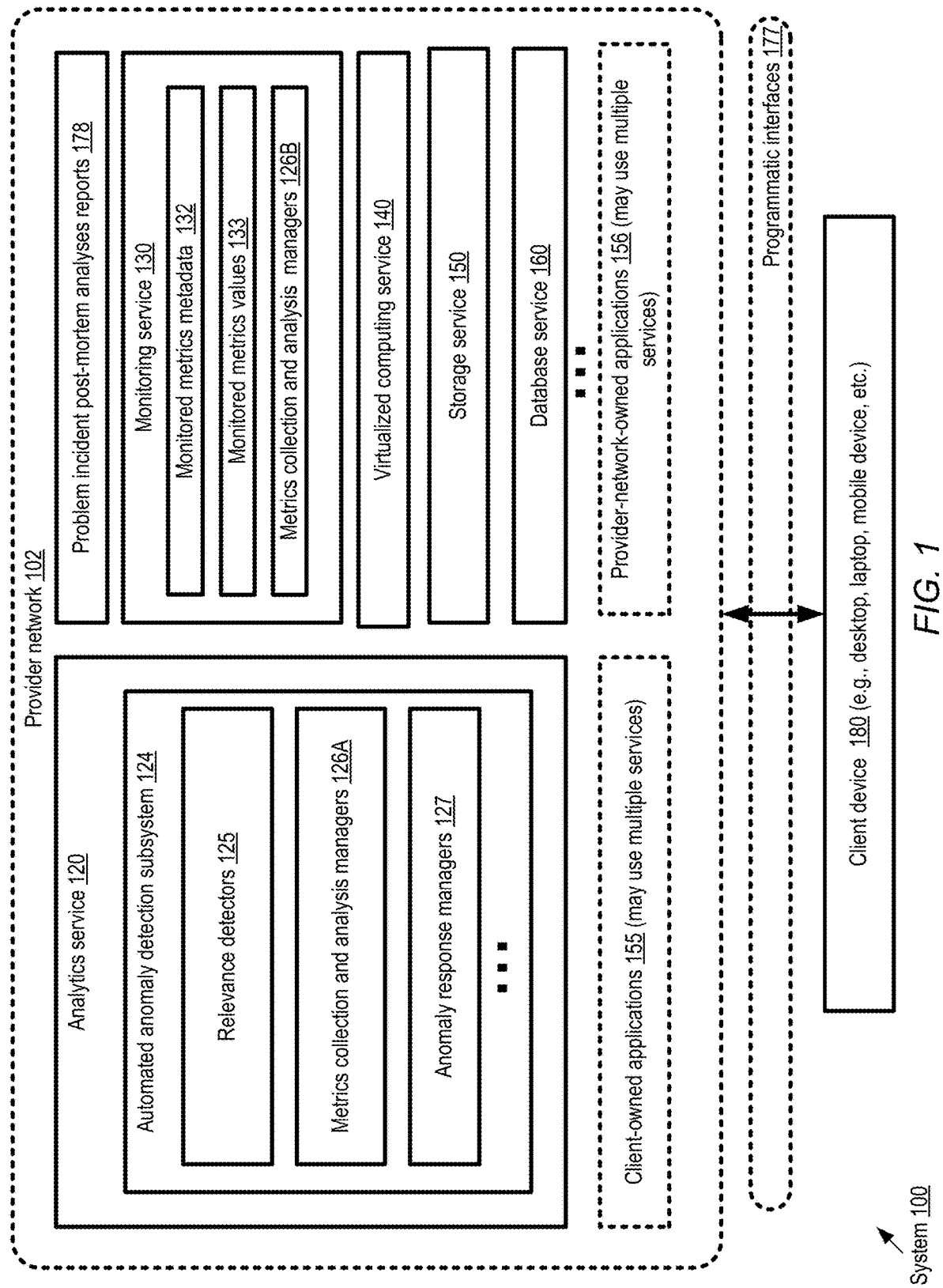
FIG. 1 illustrates an example system environment in which anomaly analysis for application metrics identified using machine learning may be performed, without requiring application owners to specify the metrics or statistics to be used for the anomaly analysis, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for automatically identifying, using machine learning techniques, metrics and/or statistics to be used to detect anomalous behaviors of applications run at provider networks or cloud computing environments. Many applications are run using resources of a variety of network-accessible services of the provider networks, including virtualized computing services (VCSs), database services, storage services, load balancing services and the like. Some such applications are designed and deployed by the operators/owners of the provider network itself, e.g., for internal administrative purposes or for use by external customers. Other such applications may be designed and developed by the external customers of the provider network. The provider network may also provide one or more monitoring services, which can be used to keep track of various application metrics selected by application owners (e.g., individuals which are part of the organization implementing the provider network, or customers of the provider network) or generated by default at a VCS, a storage service etc. The monitoring service may support various programmatic interfaces such as dashboards and the like which can be used to view the change in the metrics over time, and even provide mechanisms to allow application owners to define anomalous behaviors of various metrics (e.g., scenarios in which the values of a given metric fall outside of an expected range) and be notified when such anomalies are detected. The monitoring service may enable its clients to define alarms in some embodiments, indicating conditions under which notifications are to be provided to the clients (e.g., via the dashboards and/or other mechanisms) to indicate the occurrence of unexpected or undesired events or metric values.

At least in some embodiments, provider network operators may wish to automate the application management tasks of application owners as much as possible. Instead of requiring application owners to manually specify the metrics (e.g., custom metrics or service-defined default metrics) and/or statistics (e.g., mean, maximum, etc.) on the specified metrics which are to be collected for anomaly detection on their behalf, for example, one or more machine learning models may be trained to automate the process of selecting metrics and statistics which are likely to be useful for identifying meaningful and/or actionable anomalous behaviors of various applications. In order to train such a model, an existing corpus of metadata (and/or data) pertaining to application metrics which have been collected (and may continue to be collected) at the provider network may be used in at least some embodiments. Such metrics metadata, which may for example comprise names/hierarchies of metrics for a variety of internal (provider-network designed) and/or external (customer-designed) applications, manually-generated specifications of anomalies, records of detected anomalies, and so on, may already exist at the monitoring service of the provider network in some embodiments. In order to be able to use such information to train the model, permissions (e.g., opt-ins) may be obtained from the entities on behalf of whom the information was generated and stored in various embodiments—e.g., from application owners/administrators or service owners/administrators. The machine learning model may consume the information about metrics (e.g., in raw or processed/transformed versions) as input, and learn about the semantics and significance of the terminology/language used with respect to the metrics in at least some embodiments.

Once trained, in at least some embodiments, the model may be used to predict anomaly analysis relevance scores for input records indicating [metric, statistic] pairs for any application for which automated anomaly detection is to be performed, without requiring the application's owner or administrators to select the specific metrics and statistics to be used. An anomaly analysis relevance score for a given [metric, statistic] combination [m1, s1], which may also be referred to as an anomaly detection relevance score, may for example comprise a real number between 0 and 1 (or an integer between 0 and 100). A higher score (closer to the upper limit of 1 or 100) may indicate that collecting and analyzing the [m1, s1] combination is likely to be helpful in detecting anomalies for which some action or response is needed, or in detecting anomalies which are likely to be considered significant or useful by the application owners or administrators. Using the trained version of the model, in various embodiments the analytics service may automatically (without requiring guidance from the application owners/administrators) identify a relatively small set of metrics and statistics of a given application for which anomaly analysis may then be performed. Note that the selection of the appropriate metrics and statistics represents just one part of the overall workflow of automated anomaly detection. The overall workflow may include actually collecting the selected metrics' values, computing the selected statistics on the collected values, training additional machine learning models to determine acceptable ranges for the metric values, determining if/when the acceptable ranges are violated, initiating actions responsive to the detection of anomalies, and so on. The proposed techniques for automation of anomaly detection may be applied in a variety of problem domains in various embodiments: e.g., in the medical domain, in domains such as order fulfillment from a large-scale online retailer, and so on, in addition to the domain of management of client applications in provider network environments. For respective problem domains, one or more machine learning models may be trained using relevant domain-specific metadata to identify the metrics and statistics to be captured for anomaly detection. In one embodiment, instead of training different models for different problem domains, a single model that is capable of generating relevance scores for numerous problem domains may be trained. For such a multi-problem-domain model, a problem domain identifier may be included as a hyper-parameter or configuration setting (e.g., during training and/or after the model is trained), so that the predictions for the appropriate domain are generated.

As one skilled in the art will appreciate in light of this disclosure, certain embodiments may be capable of achieving various advantages, including some or all of the following: (a) reducing the amount of computational, memory, networking and/or other resources required to detect instances/examples of anomalous behavior of complex applications, e.g., by avoiding collecting and processing metrics values which are unlikely to be useful in detecting anomalies for which responses are required, and by avoiding having to manually label or annotate training records used for the machine learning models which predict relevance scores for anomaly analysis, (b) improving the user experience of application administrators, by not requiring the administrators to specify combinations of metrics or statistics for which anomaly analysis is to be performed, and/or (c) improving the user experience of application end users, e.g., by helping to initiate remediation actions for unusual or undesired application behaviors more quickly than may otherwise have been possible.

According to some embodiments, a system may comprise one or more computing devices. The computing devices may include instructions that upon execution on or across the one or more computing devices cause the one or more computing devices to obtain a plurality of metrics metadata records. One or more of the metrics metadata records may include one or more text attributes pertaining to custom application-level metrics for which anomaly detection has been requested by administrators of one or more internally-developed applications of a provider network (i.e., applications designed and deployed by an organization responsible for implementing the provider network). The instructions upon execution may train, using at least some of the metrics metadata records, a machine learning model to predict an anomaly detection relevance score for an input record comprising (a) a name of a metric and (b) a statistic associated with the metric. The machine learning model may, for example, include a text analyzer to which representations of the one or more text attributes are provided as input. A trained version of the machine learning model may be stored. Based at least partly on the anomaly detection relevance score obtained using the trained machine learning model for a particular metric and a particular statistic of another application (e.g., an application other than the applications whose metrics metadata was used to train the model), the collection or computation of that particular statistic for that particular metric may be initiated in at least some embodiments. Based on the collected or computed values, one or more examples of anomalous values of the particular metric may be detected. An indication of the anomalous examples may be provided via programmatic interfaces to one or more destinations, e.g., to computing devices of an administrator or owner of the other application, or to a computing device at which some automated remediation action may be initiated in response to the detected anomalies.

In various embodiments, permissions to access or examine the metrics metadata records may be obtained in advance from the entities on whose behalf the metrics metadata records are generated (e.g., clients of various services of a provider network). In some cases, the raw metrics metadata records may be transformed or anonymized before they are used to train the machine learning model.

In at least some embodiments, the metrics metadata records may have been generated and stored at a monitoring service of a provider network—e.g., a service which provides easy-to-use interfaces to enable clients of other services of the provider network (such as computing and storage services) to define, publish and/or view metrics associated with the applications run on the clients' behalf at the other services. The metrics metadata records may include several different types of elements in different embodiments, such as a metrics namespace, metrics name, collection frequencies for raw values of the metrics or specified statistics on the metrics, attributes or dimensions (describing for example the purposes of collecting the metrics, expected ranges of the metrics etc.) and the like. In at least some embodiments, a metric metadata record may include a user-defined anomaly specification (indicating the metric values or statistics which are to be deemed anomalous) and/or a count of the actual number of anomalies detected with respect to the metric over one or more time intervals. Because such metrics and anomalies may typically have been defined at the request of application owners or administrators, they may reveal the kinds of metrics and statistics that are of most benefit to the application owners/administrators with respect to taking remedial actions. Such information about previously-defined and previously-detected anomalies, and the usefulness of such information to end users, may help the machine learning model to learn about the language and terminology which may be useful and relevant for future anomaly detection and analysis.

In various embodiments, one or more data sources other than metrics metadata records may also be used to train the machine learning model to produce relevance scores for (metrics, statistics) combinations. For example, post-mortem analysis reports of problem events (e.g., large-scale outages and the like) may be available at various services of a provider network, and the text contents of such analysis reports may also be used as input for the machine learning models in some embodiments. Configuration settings of various graphical dashboards (e.g., defining the kinds of statistical data to be displayed in the dashboards, the specific metrics collected for the dashboards, alarms/notifications associated with the dashboards etc.) established for managing applications and services at a provider network may also be used to help the model to learn about the types of metrics and statistics which are of most interest to users of the provider network in some embodiments. Some dashboards whose settings are used for the training data set may have been customized by clients of the provider network, while other dashboards may include at least some default elements selected by provider network service administrators.

Anomaly analysis relevance scores for a variety of statistics with respect to a given metric may be generated by the machine learning model in different embodiments. Such statistics may include, for example, percentiles (e.g., $95^{th}$ percentile, $50^{th}$ percentile, etc.), measures of centrality (such as average, mode or median), range-related statistics (such as minimum, maximum, variance, etc.), counts of occurrences of specific metric values such as zero, sum of metrics values, and so on. In at least some embodiments, clients of a provider network may specify/define custom statistics, such as statistics having to do with rates of changes of metrics values, and anomaly analysis relevance scores may also be generated for such custom statistics using the machine learning model.

In various embodiments in which metrics and statistics are identified using the trained machine learning model as being likely to be relevant for actionable anomaly detection, the collection of at least some such metrics and statistics may be initiated automatically, without requiring specific requests for each such pair of metrics and statistics. In at least some such embodiments, the definitions or specifications of anomalies with respect to such metrics may also be generated automatically at an analytics service. In some embodiments, e.g., in response to a programmatic request, a client may be provided an indication of the identified metrics and statistics which are being collected automatically on the client's behalf. Note that in some cases, the metrics and statistics may be collected from resources of a plurality of services being used by the client's applications—e.g., some metrics and statistics may be obtained automatically from a virtualized computing service, others from a storage service, others from networking-related services, and so on. In some cases, a single metric which is found relevant to anomaly analysis may represent quantitative properties (e.g., a total time taken, or a total number of bytes transferred) of operations performed at several different services, such as a first operation performed using at least one resource of a virtualized computing service and a second operation performed using at least one resource of a storage or database service. As such, some of the metrics for which automated anomaly detection/analysis is performed in various embodiments may not necessarily have a 1-to-1 relationship with resource consumption of a given provider network service; instead, the metrics may measure events or operations which cross service boundaries.

In some embodiments, as indicated above, the techniques introduced above for identifying metrics and statistics which may be relevant for anomaly detection/analysis may be implemented at an analytics service or a machine learning service of a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as an analytics service at which composite models of the kind discussed above may be developed and deployed. A VCS may also be referred to as an elastic compute service, virtual machines service, computing cloud service, compute engine, and/or cloud compute in various implementations.

Example System Environment

FIG. 1 illustrates an example system environment in which anomaly analysis for application metrics identified using machine learning may be performed, without requiring application owners to specify the metrics or statistics to be used for the anomaly analysis, according to at least some embodiments. As shown, system 100 comprises resources and artifacts of numerous network-accessible services of a provider network 102, including an analytics service 120, a monitoring service 130, a virtualized computing service 140, a storage service 150 and a database service 160. Applications of at least two types may be run at the provider network 102 in the depicted embodiment: client-owned applications 155, and provider-network-owned applications 156. Client-owned applications 155 may, for example, be designed and developed by engineering teams of customers of the provider network, and may be run on behalf of such customers using the resources of one or more of the provider network's services such as virtualized computing service 140, storage service 150, or database service 160. Provider-network-owned applications 156 may be designed by engineering teams of the provider network operator organization, and may also use one or more services of the provider network. The provider-network-owned applications 156 may also be referred to as internally-developed applications (as they are designed/developed by teams internal to the organization operating the provider network 102), while the client-owned applications 155 may be referred to as externally-developed applications. An application which automatically divides specified collections of entity records (stored at storage service 150 or database service 160) into clusters of similar records on behalf of its clients, e.g., using compute instances of the virtualized computing service 140, may represent one example of an internally-developed application, Other examples of such internally-developed applications could include image recognition applications, email applications, messaging applications, and so on.

Various provider network services and applications run at the provider network 102 may implement one or more programmatic interfaces 177, such as web-based consoles, application programming interfaces (APIs), command-line tools, graphical user interfaces including dashboards and the like. Such interfaces 177 may be used by clients of the services or applications to submit programmatic requests, e.g., from client devices 180 such as desktops, laptops, mobile devices and the like, and receive corresponding responses.

In order to help manage their applications 155 and 156, application owners or administrators may request the collection and reporting of various types of metrics via programmatic interfaces of monitoring service 130 in the depicted embodiment. Such clients of the monitoring service 130 may, for example, define application-specific custom metrics and statistics to be collected for such metrics, or select pre-defined metrics (defined for example by each of the services used for their applications) and pre-defined statistics to be collected on their behalf. Monitored metrics metadata 132 may comprise records indicating such metrics, including such properties of the metrics as the frequency with which raw values are to be collected, the kinds of statistics to be computed, anomaly detection specifications for at least some of the metrics, and so on. Monitored metrics values 133 may actual raw values of the metrics obtained/collected over time, and/or values of the statistics computed from the raw values. The monitoring service may also include metrics collection and analysis managers 126B in some embodiments, responsible for acquiring and analyzing the metrics values 133.

The monitoring service 130 may allow its clients to provide anomaly specifications defining for example, acceptable ranges of raw values of various metrics, the rules to be used to designate some set of metrics values as anomalous (e.g., whether a single out-of-acceptable-range value constitutes an anomaly, or whether multiple successive out-of-acceptable-range values have to be obtained before a report of an anomaly is to be generated, and so on). Such manual specification of anomalies may be quite time consuming, and may also require considerable expertise on the part of the application administrators/owners or other clients.

In order to reduce the anomaly detection related workload of application administrators/owners, an automated anomaly detection subsystem 124 may be configured within analytics service 120 in the depicted embodiment. Automated anomaly detection subsystem 124 may include, among other components, one or more relevance detectors 125 (e.g., including devices at which natural language processing and other types of machine learning algorithms can be trained and executed), one or more metrics collection and analysis managers 126A, and one or more anomaly response managers 127. Each of these components of the automated anomaly detection subsystem 124 may comprise hardware and software of one or more computing devices in various embodiments.

The relevance detectors 125 may analyze existing information about metrics, such as monitored metrics metadata 132, monitored metrics values 133, and problem incident post-mortem analysis reports 178, to learn about the kinds of metrics and statistics which have proved useful for anomaly analysis in the past for various existing applications 155 and 156. This knowledge, which may be represented as learned parameters of one or more machine learning models (such as deep neural network models), may then be used in various embodiments to identify metrics and statistics which should be collected and analyzed for other applications 155 and 156 going forward, without requiring the application owners to go to the trouble of specifying the metrics/statistics or even defining anomalies.

According to at least some embodiments, the relevance detectors 125 may obtain a plurality of metrics metadata records, comprising at least some metrics metadata records which include one or more text attributes pertaining to custom application-level metrics for which anomaly detection has been requested by administrators of one or more applications of a provider network. The relevance detectors 125 may train, using at least some of the metrics metadata records, a machine learning model to predict an anomaly analysis relevance score for an input record comprising (a) a name of a metric and (b) a statistic associated with the metric. The machine learning model may, for example, comprises a text analyzer to which representations of the one or more text attributes are provided as input, and which learns internal encodings or embeddings of the input text in some embodiments, e.g., using a neural network-based machine learning algorithm. In some embodiments unsupervised learning may be used; in other embodiments, supervised, semi-supervised or a combination of unsupervised and supervised machine learning algorithms may be used. A trained version of the machine learning model may be stored by the relevance detectors 125 in various embodiments (e.g., using internal resources of the analytics service, or using storage service 150).

The automated collection of various statistics of one or more metrics of an application executed using one or more resources of the provider network may be initiated by the metrics collection and analysis managers 126A and/or 126B in the depicted embodiment. In some embodiments, metrics collection may be performed only at the monitoring service 130; in other embodiments, some metrics (e.g., those identified using the relevance detectors) may be collected and analyzed at the analytics service 120 while others may be collected and analyzed at the monitoring service 130. The collection may be initiated based at least in part on respective anomaly detection relevance scores obtained for metrics and statistics from the trained version of the machine learning model, in the depicted embodiment, without receiving specific requests indicating the particular statistic or the metric as targets for anomaly-related analysis. Based on the collected metrics and statistics, one or more examples of anomalous values or patterns of the metrics may be detected by the metrics collection and analysis managers 126 in at least some embodiments. Corresponding indications or notifications may be provided to the appropriate application owners/administrators and/or to other destinations from the automated anomaly detection subsystem 124, e.g., by anomaly response managers 127. Other types of actions may be initiated by the anomaly response managers in some embodiments if/when an anomaly is detected, e.g., including modifying the resources allocated to the application at which the anomaly was detected, initiating a post-mortem analysis, and so on. In some embodiments, an automated anomaly detection subsystem 124 may be implemented as part of the monitoring service 130, e.g., instead of as part of a separate analytics service.

Figure 2:
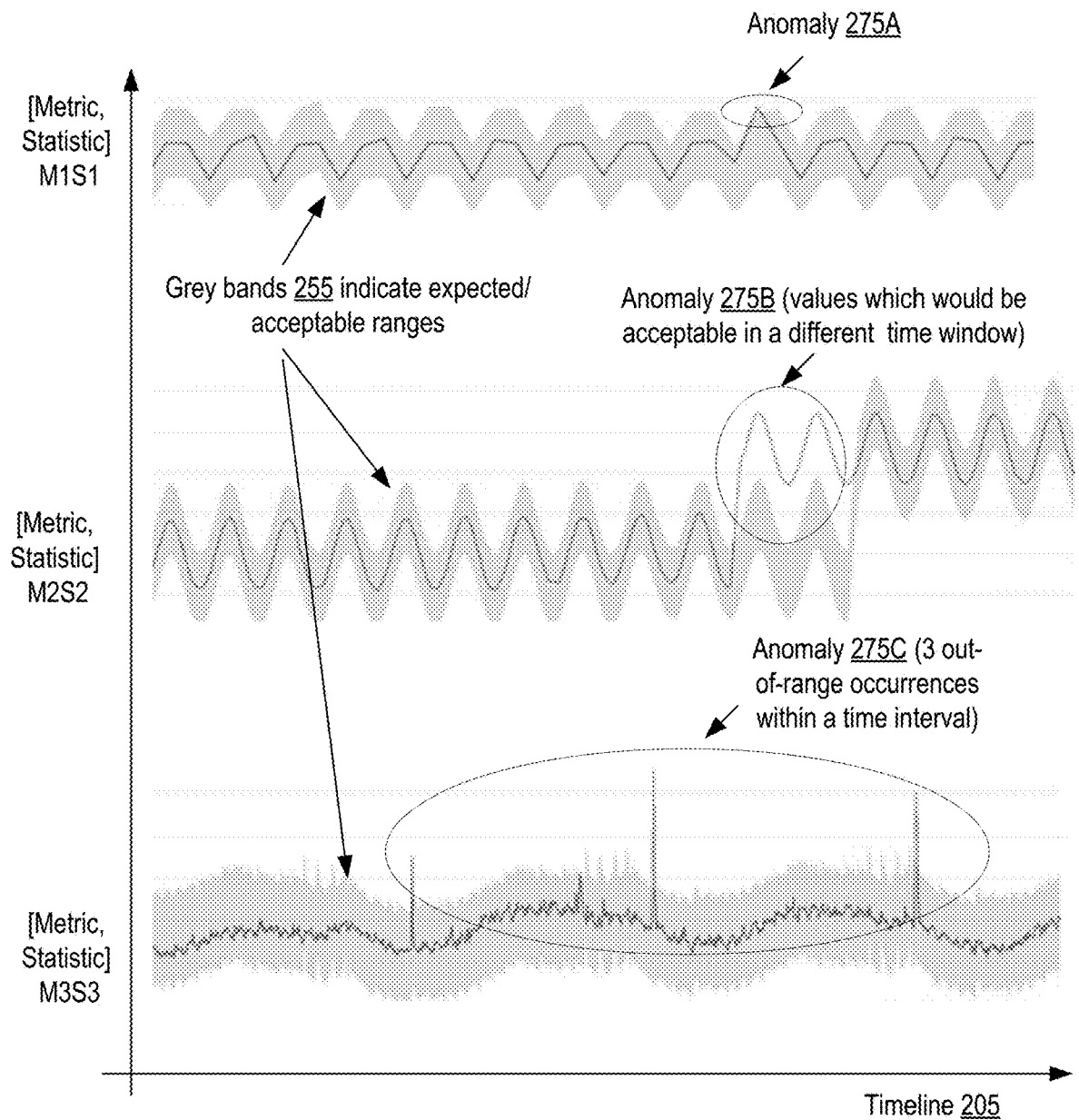
FIG. 2 illustrates examples of anomalies which may be identified with respect to automatically-selected metrics, according to at least some embodiments.

FIG. 2 illustrates examples of anomalies which may be identified with respect to automatically-selected metrics, according to at least some embodiments. The X axis of the graph shown in FIG. 2 represents a timeline 205. Values of three [metrics, statistics] combinations are shown as a function of time: M1S1, M2S2 and M3S3. For example, the metrics M1, M2 or M3 may respectively represent a response time for an application-specific request type R1, R2 or R3, and the statistics S1, S2 or S3 may represent the average response time as measured over an interval of T seconds for each of the request types. The metrics and the statistics may be identified with the help of relevance scores generated using a machine learning model trained at an analytics service similar in functionality of analytics service 120 of FIG. 1 in some embodiments.

Corresponding to each of the combinations of metrics and statistics, in at least some embodiments the analytics service may identify ranges of expected or acceptable values in the depicted embodiment. These ranges are shown by the grey bands 255 in FIG. 2. The actual statistics values measured over the time interval indicated by timeline 205 are shown by the darker lines which lie mostly within the grey bands 255.

For some metrics and statistics combinations, the occurrence of a single outlier value outside the expected/acceptable range may be designated as an anomaly for which a notification is to be generated, or for which some other remediation action is to be generated. Anomaly 275A represents one such case, in which a single a value for M1S1 exceeds the upper bound of acceptability.

In contrast to the scenario shown for M1S1, which has a relatively steady-state band of acceptable values over the entire time interval depicted along the X-axis, the acceptable values for M2S2 vary substantially in different time intervals, with a first pattern of acceptable values at a lower level and a second pattern of acceptable values at a higher level (the higher band of acceptable values corresponds to the right end of the timeline). Such temporal variations in acceptable or expected values may occur, for example, because of differences in workloads during weekends relative to weekdays, business hours versus non-business hours, and so on. For M2S2, the values designated as anomaly 275B may have been perfectly acceptable has they occurred somewhat later in time; these values are only considered anomalous because of the time at which they occurred, not because the values themselves are always unacceptable.

For some observed statistics to be considered anomalous, multiple instances may be required within a specified time interval. Thus, in the case of M3S3, three occurrences of out-of-range values within the time period shown in FIG. 2 may be required for the values to be (collectively) considered an anomaly 275C.

In at least some embodiments, an analytics service or a monitoring service (similar to services 120 and 130) may capture values of a given statistic and/or metric for some time period to help compute the bands 255 of acceptable/expected ranges for that statistic or metric. Many statistics may exhibit temporal patterns such as those shown for M1S1, M2S2 and M2S3, with values rising and falling with workload levels depending on the time of day, the day of the week, or other factors. The width of the acceptable/expected ranges (e.g., in terms of a fraction or percentage of the actual values) may be determined automatically in some embodiments by the analytics service, e.g., based on an analysis of manually-generated anomaly specifications for similar metrics and statistics combinations. Decisions as to whether a single occurrence of an out-of-range value is to be considered an anomaly, or multiple occurrences close together in time are required for an anomaly to be counted, may also be made based on analysis of existing records, including anomaly specifications, post-mortem analyses and the like in some embodiments.

Benefits of Automated Selection of Metrics and Statistics

Figure 3:
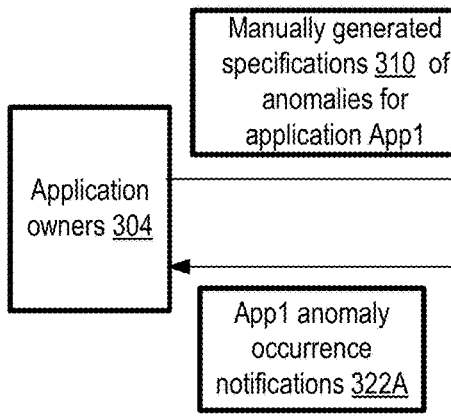
FIG. 3 illustrates example benefits of automated selection of metrics and statistics for anomaly analysis, according to at least some embodiments.
Figure 3:
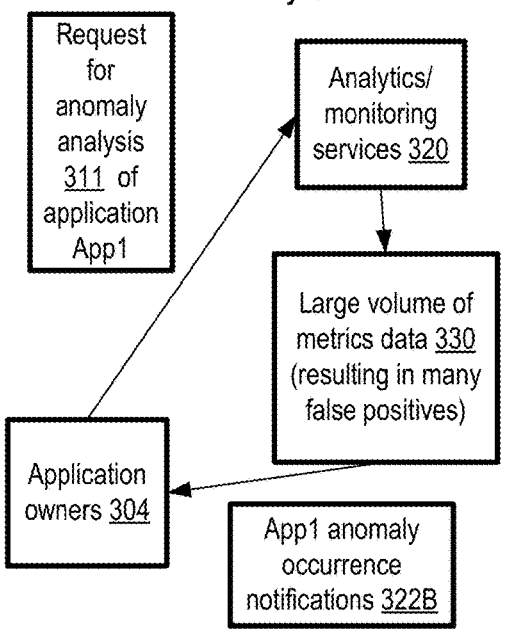
Figure 3:
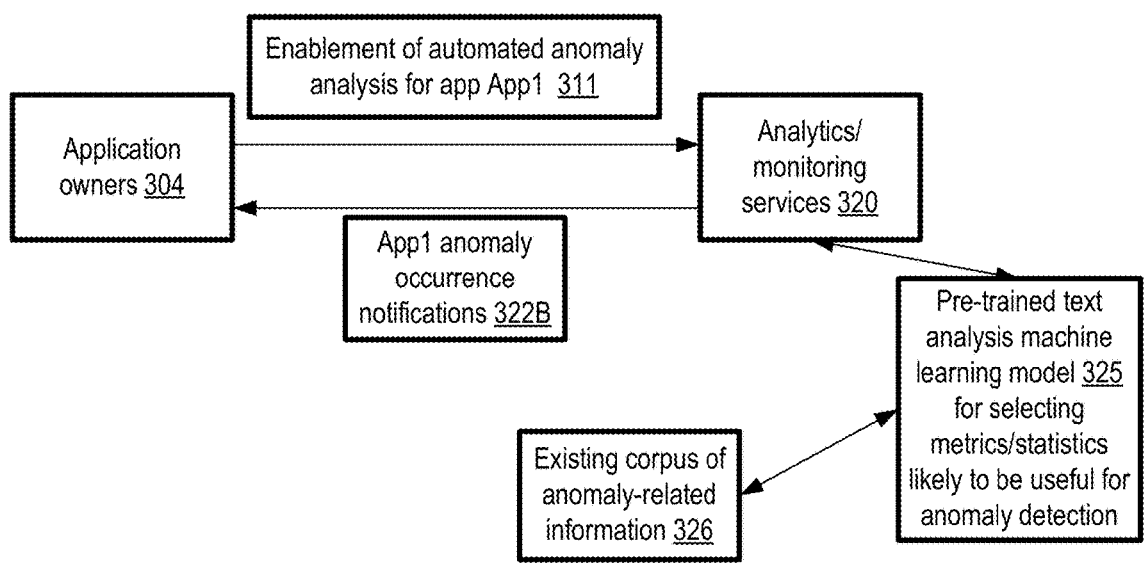

FIG. 3 illustrates example benefits of automated selection of metrics and statistics for anomaly analysis, according to at least some embodiments. In scenario A of FIG. 3, application owners 304 (or application administrators) may be responsible for identifying specific metrics and associated statistics to be collected in order to detect anomalies. Manually generated specifications 310 of anomalies for each application, such as application App1, may be provided by the application owners 304 to analytics/monitoring services 320. The services 320 may then collect the specified statistics and provide notifications 322A when anomalous values or patterns are detected in only the specified metrics and statistics. For application owners to select the right combinations of statistics and metrics, each application owner may have to have experience ahead of time regarding the kinds of problems the application is likely to encounter. If an application owner 304 is relatively inexperienced, a very large number of combinations of metrics and statistics may be specified for anomaly analysis, and many instances of apparent anomalies which do not really require any remediation action may be identified by the services 320. The application owner may have to spend a lot of time manually specifying all the different combinations in such cases, and a lot of resources may be utilized in capturing metrics which do not lead to detection of important anomalous behaviors. Alternatively, an inexperienced application owner may select very few combinations of metrics and statistics in scenario A, and as a result, some important examples of anomalous metrics may be missed, potentially leading to larger problems such as outages.

In one alternative approach, referred to in FIG. 2 as Scenario B, a brute force automated technique may be attempted. The analytics/monitoring service 320 may collect/analyze an unfiltered set (e.g., all possible combinations) of metrics and statistics that can be collected from App1 in response to a request 311 for anomaly analysis of App1. However, this approach as the disadvantage that a large volume of data 330 may have to be collected, stored and analyzed, which in turn may lead to numerous false positives with regard to anomaly detection—that is, many of the anomalies for which notifications 322B are sent to the application owners 304 may not actually require any action to be taken.

In contrast, in scenario C, the combinations of metrics and statistics that are most likely to be useful for significant anomaly detections may be selected automatically using one or more machine learning models as indicated above. Analytics/monitoring services 320 may use an existing corpus 326 of anomaly-related information, including for example metric metadata records, post-mortem analyses of problem events, and the like, to pre-train a machine learning model that can interpret the anomaly-related text attributes of the corpus to generate anomaly analysis relevance scores for various metrics/statistics combinations. If an application owner 304 decides that automated anomaly detection/analysis is to be performed with respect to a particular application App1, enablement of automated anomaly analysis may be initiated as indicated in element 311. Upon receiving the enablement request 311, the analytics/monitoring services 320 may identify candidate metrics and statistics pairs for App1 (e.g., based on custom metrics definitions provided by the application owners, and/or based on pre-existing metrics defined by one or more provider network services used for App1) and obtain corresponding relevance scores from the pre-trained text analysis machine learning model 325 for each of the candidates. For those candidates which have a high predicted relevance score (e.g., a score above a threshold selected by the analytics service), automated collection of the metrics and statistics values may be initiated, and/or anomaly specifications may be automatically generated in the depicted embodiment. App1 anomaly occurrence notifications 322B based on the automatically-selected metrics and statistics may be provided to the application owners 304 in the depicted embodiment, without requiring the effort of manual specification of anomaly descriptors from the application owners.

Example Metrics Metadata

Figure 4:
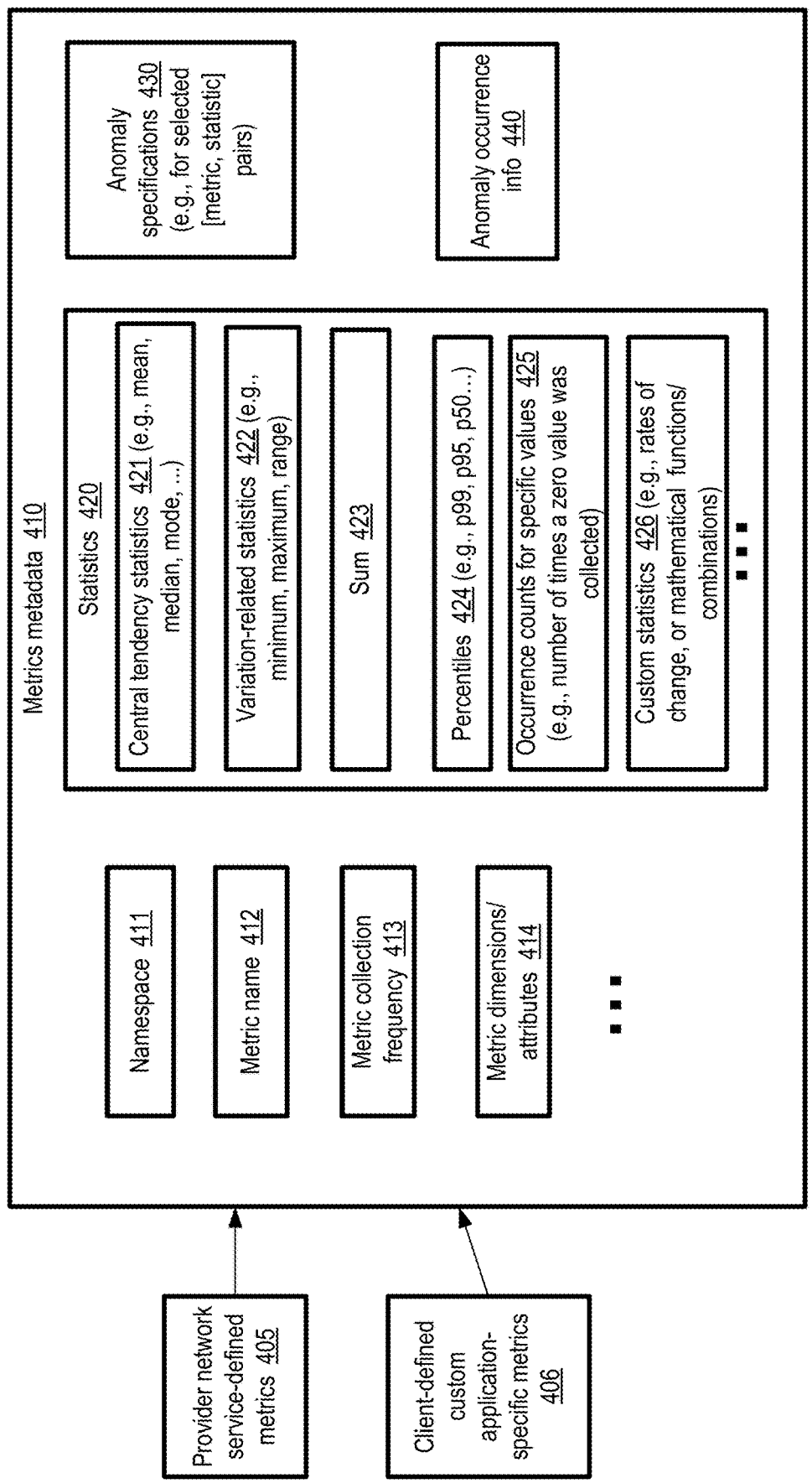
FIG. 4 illustrates example elements of metrics metadata records which may be used to train a machine learning model, according to at least some embodiments.

FIG. 4 illustrates example elements of metrics metadata records which may be used to train a machine learning model, according to at least some embodiments. In the depicted embodiment, metrics metadata 410 pertaining to at least two types of metrics may be stored, e.g., at a monitoring service similar to monitoring service 130 of a provider network: provider network service-defined metrics 405, and client-defined custom application-specific metrics 406. At least some of the provider network's publicly-accessible services, such as virtualized computing services, storage services, database services and the like may enable the service clients to view a respective default set of service-defined metrics—e.g., the number of bytes written to the storage service per second, the number of bytes read from the storage service per second, and the like in the depicted embodiment. In addition, a client may define custom metrics 406 for their applications (such as response times for various types of application-specific transactions or requests, based on the business logic of the applications), and cause the custom metrics to be collected and analyzed via application programming interfaces (APIs) of the monitoring service and/or other services. Note that a given client-defined custom metric 406 may correspond to operations that utilize multiple provider network services—e.g., a given application-specific transaction may include some tasks performed at a virtualized computing service, other tasks that use a database service, and so on, and a custom response time metric for such a transaction may measure the time taken to complete all the tasks at the different services.

Metrics of both types may be organized as a hierarchical collection of namespaces in at least some embodiments. Metrics metadata 410 for either type of metric (service-defined or client-defined) may include the name or identifier of the namespace 411 (e.g., "App1 metrics" for a custom client-defined metric or "VCS" for a metric defined at a virtualized computing service) and the metric name 412 (e.g., "Transaction-T1 Response Time" for a custom application-specific metric or "Bytes-read" for a service-defined metric). The metric collection frequency 413 may indicate the rate at which raw values of the metric are to be collected—e.g., once per N seconds or one per N minutes. Metrics dimensions/attributes 414 may comprise text tokens that describe the purpose of collecting the metric, the meaning of the metric, the scope of the metric (e.g., whether metrics should be recorded separately for each of several compute instances running an application, or combined for all the compute instances) and the like in various embodiments.

A number of options for statistics to be collected, computed, stored and/or displayed (e.g., via graphical interfaces) for a given metric may be available, and metadata about the specific statistics that a client wishes to access may be stored in the statistics portion 420 of the metrics metadata 410 in the depicted embodiment. Central tendency statistics 421 such as mean, median or mode may be determined for some metrics over specified time intervals selected by the client on whose behalf the metrics values are collected in some embodiments. Variation-related statistics 422 such as the minimum, maximum or range may be obtained for various metrics. For some metrics, computing the sum 423 may be useful. Percentiles 424 (such as p99, p95, p50 or the $99^{th}$, $95^{th}$ or $50^{th}$ percentile) may be computed if desired for some metrics. The number of occurrences of a specific value (e.g., zero) for a metric may be collected and displayed if desired as an occurrence count statistic 425 in some embodiments. Clients may also define custom statistics 426, such as statistics based on the rates of change of metric values, in some embodiments. In at least one embodiment, custom statistics 426 may include statistics based on applying client-specified mathematical functions to metrics values, and/or combining values of multiple metrics. For example, a client may use programmatic interfaces of a monitoring service or an analytics service to provide a definition of a custom statistic that combines the values of several related, and such a combination-based statistic may then be used to detect anomalies instead of using the values of any single underlying metric alone. Client-provided definitions of custom statistics 426 may be extremely useful for training machine learning models to identify relevant statistics and metrics for automated anomaly detection, as these definitions may capture characteristics of the kind of data that is valuable to experienced administrators in understanding application behavior.

According to at least one embodiment, the metrics metadata available for training machine learning models may also include anomaly specifications 430 and/or records containing information about detected anomaly occurrences 440 with respect to various metrics and statistics combinations. Some anomaly specifications may be provided as defaults for service-defined metrics, while other anomaly specifications stored as part of the metrics metadata 410 may be created by clients (for custom application-specific metrics 406 or for service-defined metrics 405) and provided to a monitoring service via programmatic interfaces in the depicted embodiment. In at least some embodiments, as mentioned earlier, an analytics service may automatically generate some anomaly specifications for metrics and statistics which are found to have high relevance scores for anomaly analysis. It is noted that in some embodiments, metrics metadata 410 may comprise other elements than those shown in FIG. 4, or may be organized and stored in a different manner. For example, separate data structures may be used for statistics and for anomaly-related information in some embodiments, with pointers to such data structures being stored in the data structures used to store metric namespace and name information. Not all the elements of the metrics metadata 410 shown in FIG. 4 may necessarily be populated in at least some embodiments—e.g., the metrics dimensions/attributes element 414 may be left empty if desired.

Example Anomaly Specifications

Figure 5:
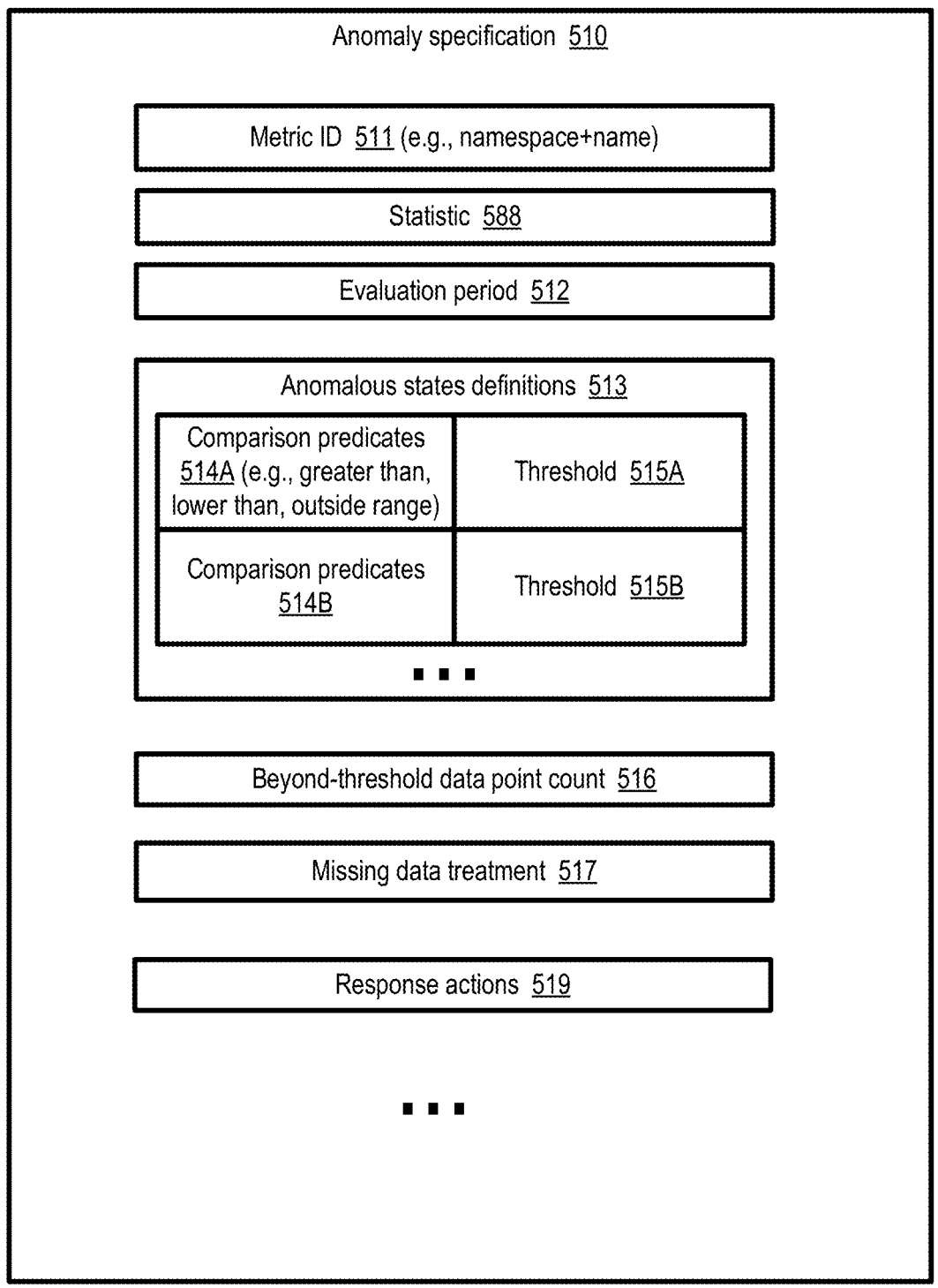
FIG. 5 illustrates example elements of anomaly specifications, according to at least some embodiments.

FIG. 5 illustrates example elements of anomaly specifications, according to at least some embodiments. As shown, an anomaly specification 510 may indicate the metric identifier 511 (e.g., a namespace and metric name, similar to elements 411 and 412 of FIG. 4) and the statistic 588 with respect to which anomalies are to be detected. Note that in some embodiments, the raw values of the metrics may be used for anomaly detection—that is, no additional statistic may have to be computed from the raw value. In some implementations, the statistic 588 may be set to an identity function (or left blank) if anomalies are to be detected with respect to raw metric values.

Evaluation period 512 may indicate the time period (e.g., in minutes or seconds) over which the statistic is to be aggregated into a single data point for the purposes of anomaly detection in some embodiments. If the evaluation period is set to two minutes, for example, all the values of the statistic gathered over a given two minute interval may be aggregated to produce a single value, so that 30 values may be considered for anomaly evaluation in an hour.

One or more definitions 513 of anomalous states may be indicated as part of an anomaly specification in the depicted embodiment. Each anomalous state may be defined using a comparison predicate 514 (e.g., 514A or 514B) and a corresponding threshold (e.g., 515A or 515B). For example, for a given statistic S1, one anomalous state may be defined as "greater than Value1" (with "greater than" representing the comparison predicate, and "Value1" the threshold), while a second anomalous state may be defined as "less than Value2". In such a scenario, if S1 exceeds Value1 or is less than Value2, an anomalous state occurrence may be recorded by the analytics service or the monitoring service responsible for detecting anomalies.

For some use cases, multiple violations of thresholds (as indicated in the anomalous state definitions 513) may be needed for an anomaly remediation/response action (such as a notification or alarm) to be taken; for other use cases, a single occurrence of an anomalous state may suffice. The beyond-threshold data point count field 516 may be used to indicate the number of anomalous state occurrences that are required for an anomaly response action: for example, if at least two anomalous states have to occur within 5 minutes, the beyond-threshold data point count field 516 may be set to "2 in 300 seconds".

The missing data treatment element 517 may indicate how the analytics or monitoring service is to deal with missing statistics values when detecting anomalies—e.g., whether missing values are to be treated as acceptable, as breaching/violating the thresholds defined for anomalous states, or ignored. Guidance as to how to handle small counts of values for percentiles may also be provided in an anomaly specification 510 in some embodiments.

Response actions 519 may indicate the specific operations to be initiated when an anomaly is detected in the depicted embodiment. A wide variety of actions may be specified in different embodiments—e.g., a notification may be sent via a specified mechanism to an application's administrators, a program specified by the application's owners/administrators may be executed, the rate at which the application whose metrics were found to be anomalous accepts new requests may be throttled, and so on.

Example Continuous Machine Learning Model Training Pipeline

Figure 6:
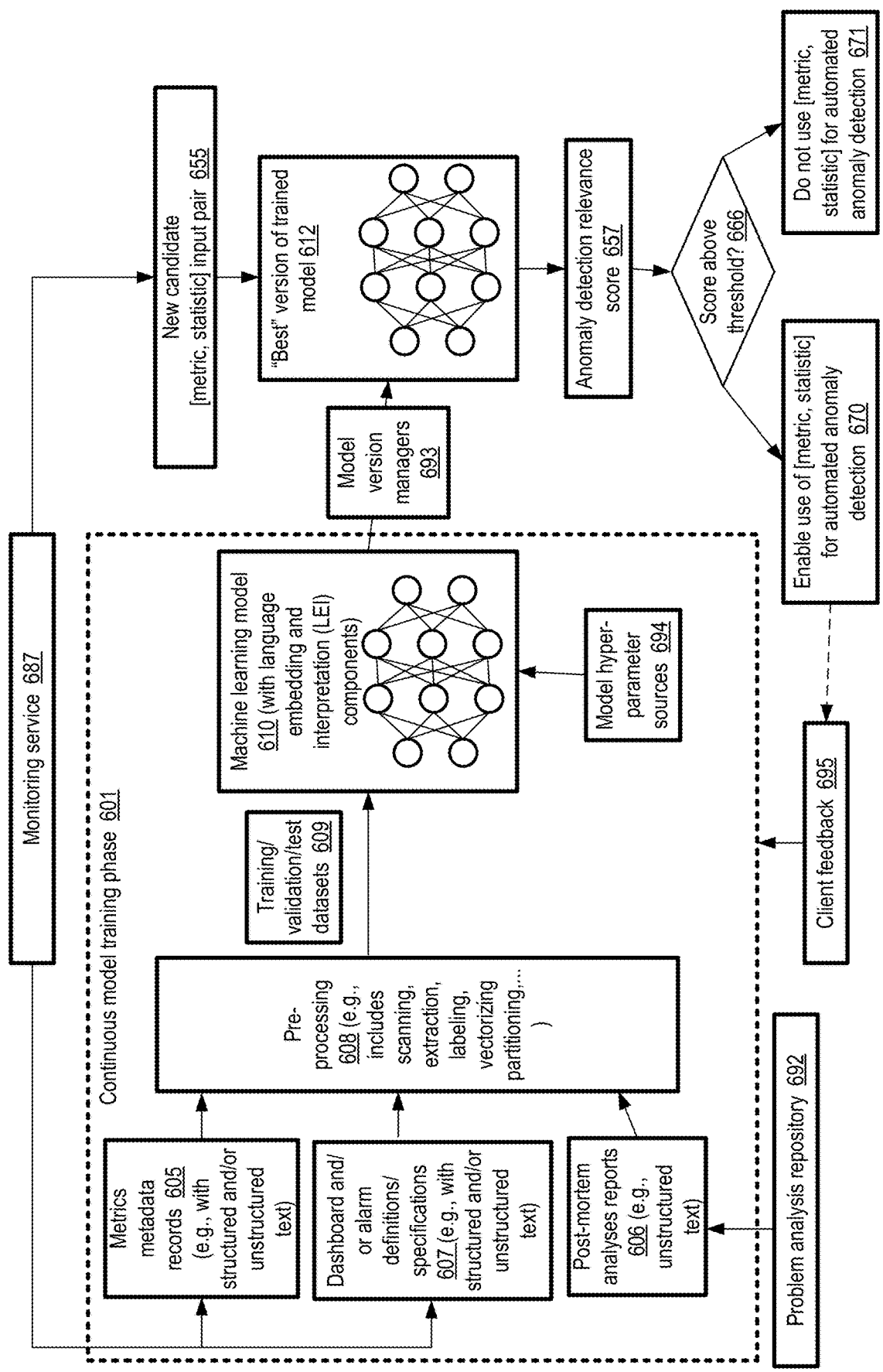
FIG. 6 illustrates aspects of a pipeline for the continuous training and use of a machine learning model for predicting anomaly analysis relevance scores, according to at least some embodiments.

In some embodiments, as more metrics metadata and other inputs usable for the metrics/statistics selection decisions become available over time, the machine learning model may be improved on an ongoing basis. FIG. 6 illustrates aspects of a pipeline for the continuous training and use of a machine learning model for predicting anomaly analysis relevance scores, according to at least some embodiments. In the depicted embodiment, a machine learning model 610 with language embedding and interpretation (LEI) components (including one or more text analyzers) may be trained iteratively to generate anomaly analysis relevance scores for combinations of metric names and statistics. In continuous model training phase 601, batches of records comprising at least some text attributes may periodically be obtained, e.g., from sources such as a monitoring service 687 and a problem analysis repository 692 of a provider network, processed/transformed in a pre-processing phase 608 and then provided as input to train the model. New iterations of training may be initiated in some embodiments in response to detecting that a threshold number of new metrics metadata records, dashboard definitions or problem analyses reports have become available; in other embodiments, the new iterations may be initiated according to a pre-determined schedule (e.g., once every T hours or days) unless the volume of new available data which can be used for re-training is below a threshold. In at least some embodiments, the model may comprise neural network layers. A supervised learning model may be used in some embodiments, while un-supervised or semi-supervised models may be used in other embodiments.

The records used to train and test the model 610 may include, among others, metrics metadata records 605 (e.g., with elements/fields similar to those shown in FIG. 4), post-mortem analysis reports 606 produced for understanding root causes of various failure events or problem events at a provider network and avoiding recurrences of the failure/problem events, and/or dashboard/alarm definitions or specifications 607 created by clients of a monitoring service to enable the graphical presentation of important metrics/trends of the clients' applications and to receive notifications when unusual metrics/trends are detected. Some of the records may comprise structured and/or unstructured text attributes—for example, metrics metadata records, dashboard definitions and/or alarm definitions may be organized as a collection of elements or fields of the kind discussed above. Some fields of metrics metadata, dashboard definitions and/or alarm definitions may comprise unstructured text (such as dimensions/attributes). Post-mortem analyses reports may primarily comprise unstructured text in at least some embodiments. The pre-processing 608 may include, for example, operations such as scanning, extraction, case normalization, punctuation removal, stemming, discarding of common words like "and", "the" and the like and the extraction of terms representing metric names and statistics names in some embodiments. In at least some embodiments in which supervised learning is used, the pre-processing stage 608 of the pipeline may also comprise obtaining labels for the records (e.g., from a selected set of annotators). The records may also be vectorized (transformed into vectors suitable for use as input to the type of machine learning model being used). For supervised learning, the labeled records may be subdivided into training, evaluation and test datasets 609 in various embodiments.

In some embodiments, the model may be trained using a technique referred to as generative pre-training (GPT) followed by discriminative fine tuning. In the generative pre-training phase, an unlabeled collection of text tokens may be consumed as input, e.g., by a multi-layer transformer decoder in which stochastic gradient descent is used to learn parameters for predicting the occurrences of particular tokens given a sequence of earlier tokens. Such a transformer decoder may, for example, apply a multi-headed self-attention operator over the input tokens, followed by position-wise feedforward layers which produce an output distribution over target tokens in some embodiments. In some implementations, each sub-block of the transformer decoder may have a normalization layer configured, similar to a pre-activation residual network. After the unsupervised pre-training of the model is completed, the model's learned parameters may be modified in the discriminative fine tuning phase to generate anomaly analysis or anomaly detection relevance scores, e.g., using additional labeled training records comprising metrics and statistics names. In effect, the generative pre-training phase may be used to learn and encode enough characteristics of the input text so that only a relatively short fine-tuning phase is required to make the kinds of predictions required for selecting appropriate metrics and statistics for anomaly analysis/detection. Other types of neural network based models (e.g., models which employ Long Short-Term Memory units or LSTMs, other types of sequence learning models, etc.) and/or models which do not employ neural networks may be used in some embodiments for predicting the relevance scores. Hyperparameters for the model (such as the type of algorithm to be used, learning rates, loss functions and the like) may be obtained from one or more hyper-parameter sources 694 (e.g., data scientists, or automated hyper-parameter selection programs) in the depicted embodiment. As mentioned earlier, any of a variety of training techniques may be used in different embodiments, including training comprising at least some unsupervised phases, semi-supervised phases, and/or supervised phases.

After each iteration of training, the latest trained version of the model may be stored, e.g., at a repository of an analytics service of a provider network. One or more model version managers 693 may be responsible for identifying (e.g., based on a comparison of model results obtained using the test datasets) the current best version of the model, and publishing that best version to one or more model execution resources used for automated selection of metrics/statistics combinations for new applications deployed at a provider network. Any of a variety of model quality metrics may be used to select the current best version in different embodiments, such as accuracy, precision, recall or F1 scores. As more metrics metadata, dashboard definitions, alarm definitions, and/or post-mortem analysis reports become available from sources such as the monitoring service 687 and the problem analysis repository 692, new iterations of model training may be performed in the depicted embodiment, thus gradually increasing the quality of the predictions of the model.

When an indication is received that automated anomaly detection is to be performed with respect to a given application, a set of new candidate metrics and statistics input pairs 655 may be identified for the application in various embodiments. In some embodiments, for example, the application owner or administrator may define some number of custom metrics for the application and provide an indication of the custom metrics to the monitoring service; in such embodiments, the names of such metrics and associated statistics may be used to construct the candidate pairs. In one embodiment, at least some statistics for service-defined metrics which are available from one or more of the services used by the application may also be designated as candidates for analysis using the best trained version of the model 612.

Respective anomaly detection relevance scores 657 (e.g., real numbers in the range 0-1, or integers in the range 0-100) may be predicted for each of the candidate pairs in the depicted embodiment by the trained model 612. In at least some embodiments, confidence levels may also be generated for the relevance scores. The analytics service may define a threshold (which may itself be tuned over time) in various embodiments for the relevance scores to determine whether any given metric and statistic combination should be used for anomaly detection. If the relevance score exceeds the threshold, as detected in operations corresponding to element 666, the use of the candidate [metric, statistic] pair may be enabled for automated anomaly detection as indicated in element 670 in the depicted embodiment; as such, an anomaly specification for the metric, statistic pair may be automatically generated, automated collection of raw values and automated computation of the statistic metric may be initiated, and so on. In at least some embodiments, a client such as an application owner may be provided a representation of an auto-generated anomaly specification, and may modify the specification (e.g., by changing the thresholds used to define anomalous states) via one or more programmatic interactions if desired. In various embodiments, a fleet of worker nodes (e.g., of an analytics service) may be configured to obtain notifications of the enablement decisions regarding the anomaly detection relevance scores, and pass the enablement decisions on to the resources responsible for collecting and analyzing the metrics/statistics.

If the relevance score does not exceed the threshold, as detected in operations corresponding to element 671, the candidate [metric, statistic] pair may not be used for automated anomaly detection as indicated in element 671. By eliminating such candidates from further consideration, the amount of resources which might otherwise have been wasted in collecting and analyzing such less useful metrics and statistics may be reduced substantially. In at least some embodiments, as the model is re-trained over time, analysis of candidate metrics and statistics using the updated model may be repeated during the lifetime of a given application. Some long-lasting applications' workloads and behavior may change substantially over time, and the scores that the model generates for various candidate pairs of metrics and statistics may also change over time for such applications. In some embodiments, clients on whose behalf the automated anomaly detection is being performed may provide client feedback 695, indicating whether the clients found the particular combinations of metrics and statistics that were selected using the model 610 useful or not. Such client feedback 695 may also be used to improve the model 610 over time, e.g., by labeling combinations of statistics and metrics used for re-training the model based on whether the client found them useful or not.

In at least one embodiments, in addition to or instead of using only text containing metrics-related information to train the model used for relevance score prediction, input comprising the time series of the values of one or more metrics (or the values of associated statistics) may also be used for training the model. In such an embodiment, the model may be able to learn about useful metrics/statistics from the variations in the values collected over time—for example, if some metrics do not vary much over long periods, they may be discarded as candidates for anomaly detection, even if the metrics' metadata suggests otherwise.

Example Programmatic Interactions

Figure 7:
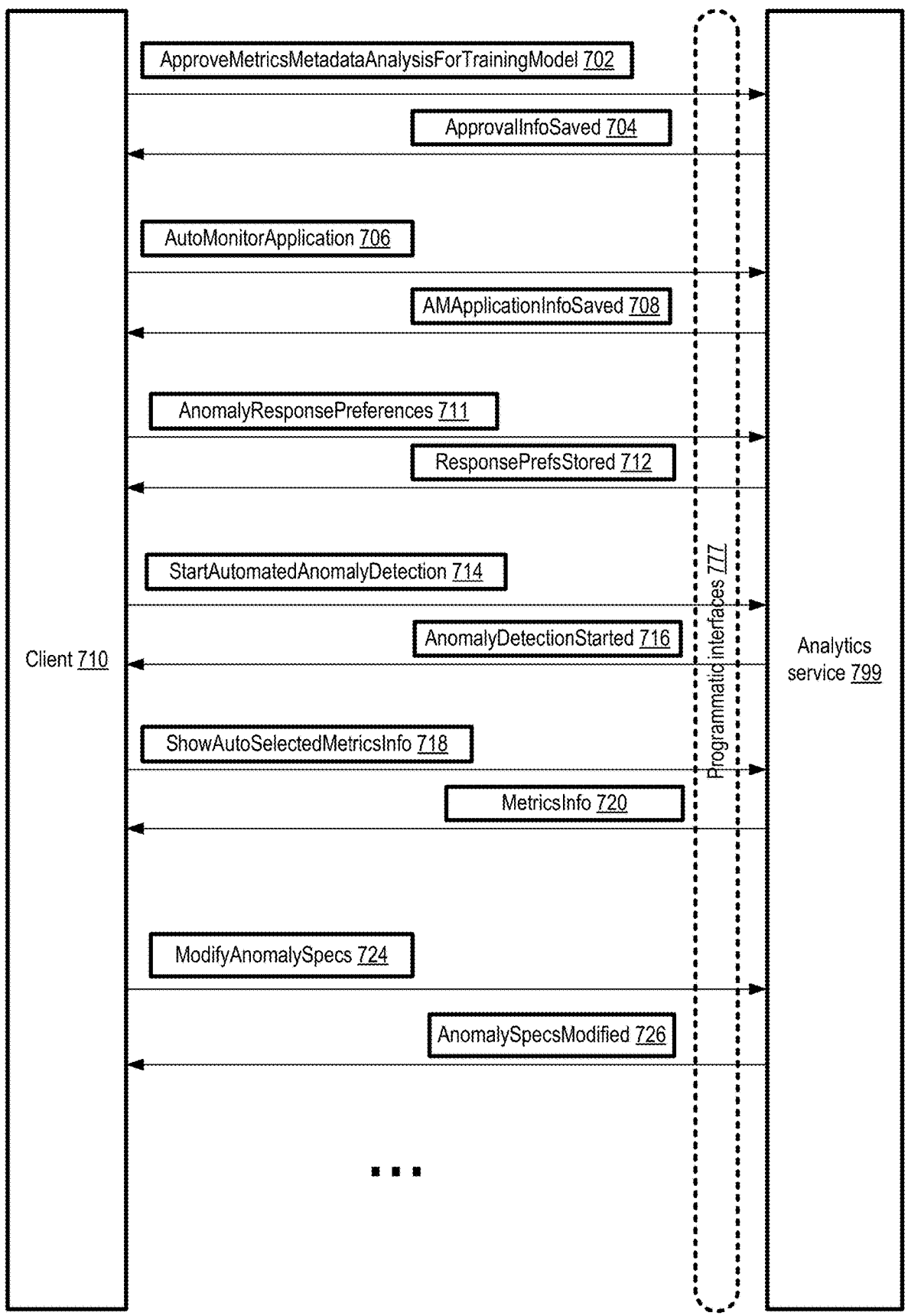
FIG. 7 illustrates example programmatic interactions pertaining to automated anomaly analysis, according to at least some embodiments.

FIG. 7 illustrates example programmatic interactions pertaining to automated anomaly analysis, according to at least some embodiments. In the embodiment depicted in FIG. 7, an analytics service 799 (similar in features and functionality to analytics service 120 of FIG. 1) may implement a set of programmatic interfaces 777, such as a web-based console, command-line tools, APIs, graphical user interfaces and the like. Clients 710 of the analytics service (such as application owners/administrators) may submit various types of requests associated with automated anomaly analysis vie the interfaces 777 and receive corresponding responses.

A client 710 may have one or more applications already running at a provider network at which the analytics service 799 is implemented in some cases, and metrics of various types may already be collected for such applications and analyzed for anomalies at the request of the client. The client may have full control over the metadata of the metrics being collected on the client's behalf. In at least some embodiments, a client may transmit an ApproveMetricsMetadataAnalysisForTrainingModel message 702 to the analytics service, granting permission to the analytics service to use the metrics metadata stored for the client's application, if needed, to train one or more machine learning models of the kind discussed above. In at least one embodiment, the analytics service 799 may request such permissions from the clients via the programmatic interfaces 777, and the permissions may be granted in response. The analytics service 799 may save a representation of the permissions and send an ApprovalInfoSaved message 704 to the client 710 in some embodiments.

In at least some embodiments, a client 710 may provide information to the analytics service 799 about an application for which automated anomaly detection is to be performed, e.g., by sending an AutoMonitorApplication request 706. Such a request may, for example, provide a descriptor of the application which is to be monitored for anomalies, indicating the provider network resources (e.g., compute instances, database instances, storage objects, isolated virtual networks, etc.) being used for the application. In some embodiments in which automated anomaly detection is performed for several different problem domains, such as a medical domain, a retailer order fulfillment domain, and the like, an indication of the problem domain may be included in the request 706, and used to (for example) select a particular pre-trained model from a suite of models that collectively cover the different problem domains. From the information contained in the AutoMonitorApplication request, the analytics service 799 may be able to generate lists of metrics and statistics for which relevance scores for anomaly detection can be obtained using a pre-trained machine learning model in the depicted embodiment. For example, metadata of custom metrics defined by the application owners/administrators at a monitoring service of the provider network may be accessed based on a namespace corresponding to the application's name, service-defined metrics may be identified based on the combination of services being used for the application, and so on. In some embodiments, the analytics service may define custom metrics for the application, and include such metrics among the candidates for which relevance scores are generated. For example, if the application descriptor indicates one or more types of end-user requests of the application, transaction response time metrics for such end-user requests may be defined by the analytics service 799 in one embodiment. The information contained in the AutoMonitorApplication request 706 may be stored at the analytics service, and an AMApplicationInfoSaved message 708 may be sent to the client 710 in at least some embodiments.

In various embodiments, a client 710 may indicate preferences about the kinds of actions that are to be taken if and when an anomaly is detected with respect to metrics/statistics of an application. Such preferences may be indicated via one or more AnomalyResponsePreferences messages 711 in the depicted embodiment. The preferences may indicate, for example, the notification channels/mechanisms (e.g., e-mail, text messages, messages sent to a message queue service or notification service of a provider network) to be used to inform the client about a detected anomaly, whether any other actions such as application request throttling or the like should be performed in response to a detection of an anomaly, and so on. The analytics service 799 may store the preferences regarding the responses, and send a ResponsePrefsStored message 712 back to the client in the depicted embodiment.

A client may submit a StartAutomatedAnomalyDetection request 714 to the analytics service in at least one embodiment to enable the automated collection of metrics and statistics for detecting anomalies with respect to a specified application. In response, the analytics service 799 may initiate the collection and analysis of the metrics/statistics for which sufficiently high relevance scores were generated using a machine learning model. An AnomalyDetectionStarted message 716 may be sent to the client in the depicted embodiment. In effect, the StartAutomatedAnomalyDetection request may represent the equivalent of a one-click enablement of automated anomaly analysis shown in element 311 of FIG. 3.

In at least some embodiments, a client 710 may wish to view information about the metrics/statistics that have been identified/designated as relevant for anomaly detection automatically for an application by the analytics service. A ShowAutoSelectedMetricsInfo request 718 may be submitted via programmatic interfaces 777 in the depicted embodiment to obtain such information. In response, one or more MetricsInfo messages 720 may be sent to the client. The MetricsInfo messages 720 may, for example, indicate the set of metrics/statistics which are being automatically collected based on predicted relevance scores, the scores themselves, the corresponding anomaly specifications being used, and so on. In some embodiments, time series of values of the statistics may also be displayed via programmatic interfaces 777 if desired by the client.

If a client wishes to modify an anomaly specification being used for their auto-monitored application, a ModifyAnomalySpecs request 724 may be submitted in the depicted embodiment via programmatic interfaces 777. The client may, for example, modify the thresholds and/or comparison predicates being used, add or remove anomalous state definitions, and so on. In response, the anomaly specifications may be modified and an AnomalySpecsModified response message 726 may be sent to the client in some embodiments. The modified anomaly specifications may be used going forward for the client's application. In at least some embodiments, programmatic interactions other than those shown in FIG. 7 may be supported by an analytics service 799.

Methods for Automated Selection of Metrics and Statistics for Anomaly Analysis

Figure 8:
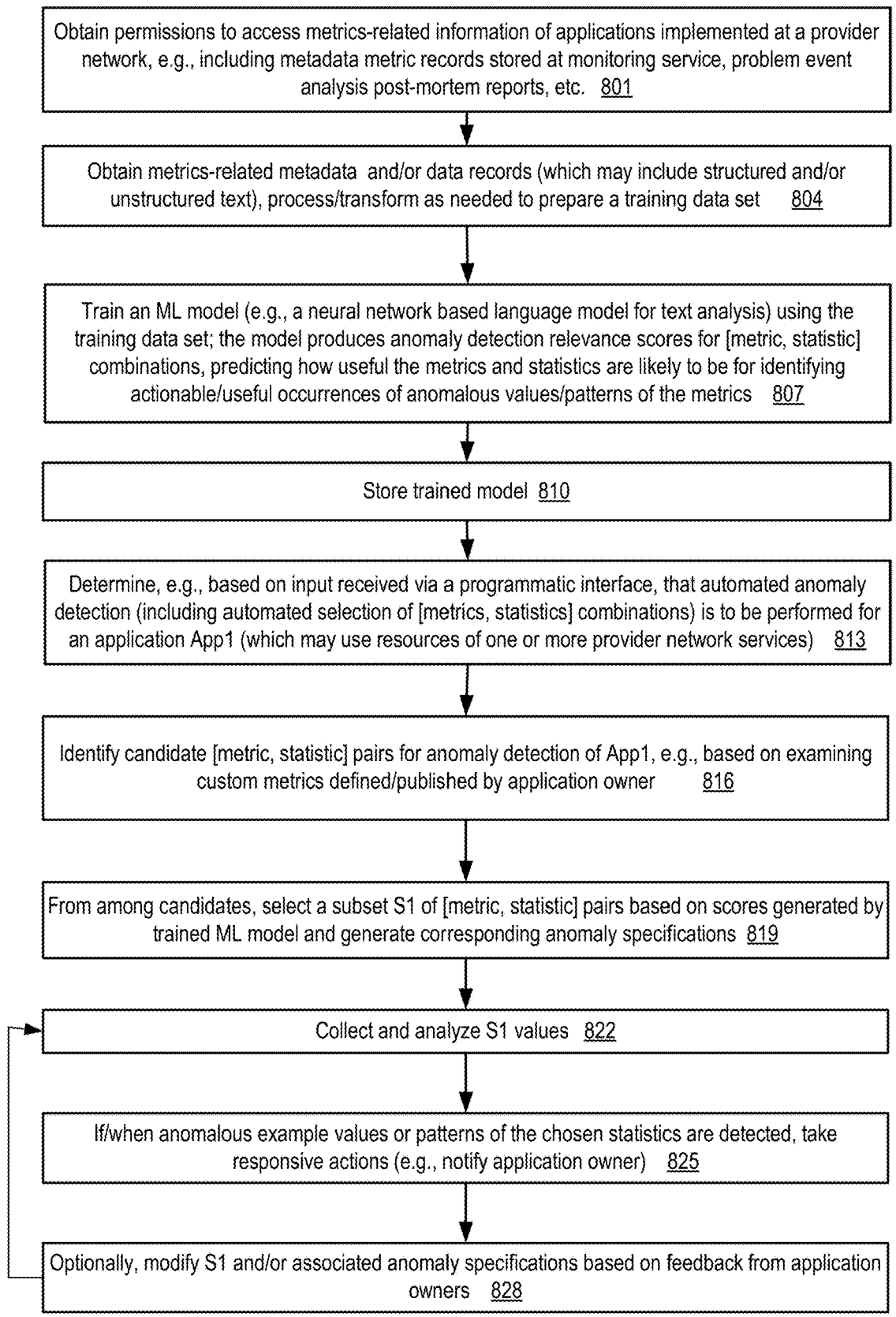
FIG. 8 is a flow diagram illustrating aspects of operations that may be performed to facilitate the automated selection of metrics and statistics to be collected for anomaly analysis, according to at least some embodiments.

FIG. 8 is a flow diagram illustrating aspects of operations that may be performed to facilitate the automated selection of metrics and statistics to be collected for anomaly analysis, according to at least some embodiments. As shown in element 801, permissions may be obtained, e.g., via programmatic interfaces of an analytics service similar to analytics service 120 of FIG. 1, to access metrics-related information of applications implemented at a provider network from the owners of the information (e.g., administrators/owners of the applications). The metrics-related information may, for example, include metadata records similar to those discussed in the context of FIG. 4 which may be stored at a monitoring service, as well as dashboard/alarm specifications/representations, post-mortem analyses records for problem events encountered at the provider network, and so on. At least some of the metrics metadata records may represent metrics for which anomaly analysis has been requested, e.g., by administrators of internally-developed applications of the provider network or by administrators/owners of client-designed applications run using resources of the provider network.

The metrics-related data, which may include structured or unstructured text may be obtained and processed/transformed in various ways to prepare a training data set for a machine learning model (element 804). A machine learning (ML) model may then be trained, using the training data set, to produce anomaly detection/analysis relevance scores as output for input records indicating combinations of metrics and statistics (element 807). The scores may indicate how useful the metrics and statistics are likely to be for identifying actionable or useful occurrences of anomalous values or patterns of the metrics. In at least some embodiments, the ML model may comprise one or more neural networks, including at least some neural networks which perform text analysis and may be referred to as text analyzers. Such models may be referred to as language embedding and interpretation models. A trained version of the model may be stored (element 810).

A determination may be made, e.g., based on input received via a programmatic interface of an analytics service or a monitoring service, that automated anomaly detection or analysis, including automated selection of [metrics, statistics] combinations to be collected and analyzed, is to be performed for a given application App1 (element 813). App1 may, for example, use resources of one or more provider network services such as a computing service, a storage service, a database service and the like. A set of candidate metrics and statistics combinations may be identified for App1 (element 816), e.g., based on an examination of custom metrics defined and/or published to the monitoring service by App1's owner, and/or based on service-define metrics available for the services used by App1.

From among the candidate pairs of metrics and statistics, a subset S1 may be selected, e.g., based on the corresponding relevance scores generated using a trained version of the ML model (element 819). Corresponding anomaly specifications may be generated automatically or obtained in the depicted embodiment for the selected candidates. In some embodiments, having selected a metric and statistic combination for which anomaly analysis should be performed, a proposed anomaly specification for that combination may be generated and provided to a client for approval; if the client wishes to modify the anomaly specification, the client may do so via one or more programmatic interfaces. If a client decides that a particular statistic should not be collected for a particular metric (with the metric and statistic having been identified automatically using a score generated by the ML model), the client may send a programmatic request not to collect the statistic in at least some embodiments. The values of the combinations of metrics and statistics of S1 may be collected and analyzed (element 822). In some cases, as mentioned above, some collected metrics values may be aggregated, or mathematical functions may be applied to combinations of metrics based on the analysis of custom statistic definitions. If/when anomalous values or patterns are detected in the collected data, responsive actions may be initiated in the depicted embodiment—e.g., indications of the detected anomalies may be provided via one or more programmatic interfaces to one or more destinations (such as the application owners) (element 825). Optionally, if needed, the set S1 and/or corresponding anomaly specifications may be modified (element 828), and operations corresponding to elements 822 onwards may be repeated.

It is noted that in various embodiments, some of the operations shown in the flow diagram of FIG. 8 may be implemented in a different order than that shown in the figure, or may be performed in parallel rather than sequentially. Additionally, some of the operations shown in FIG. 8 may not be required in one or more implementations.

Use Cases

The techniques described above, of training a machine learning model to predict anomaly analysis relevance scores for metrics of applications run at a computing environment such as a provider network may be extremely beneficial in a number of scenarios. Operators of provider networks are always striving to simplify the workload of provider network clients such as administrators or owners of distributed applications. By using machine learning models trained using an existing corpus of metrics-related information to automatically select metrics and statistics for which anomaly analysis is likely to be useful, the application owners/administrators may be relieved of the tedious tasks of identifying such metrics manually. Furthermore, by filtering out combinations of metrics and statistics which are unlikely to be useful for actionable anomaly analysis, the overall amount of resources used for collecting, storing and analyzing metrics and statistics may be reduced considerably.

Illustrative Computer System

Figure 9:
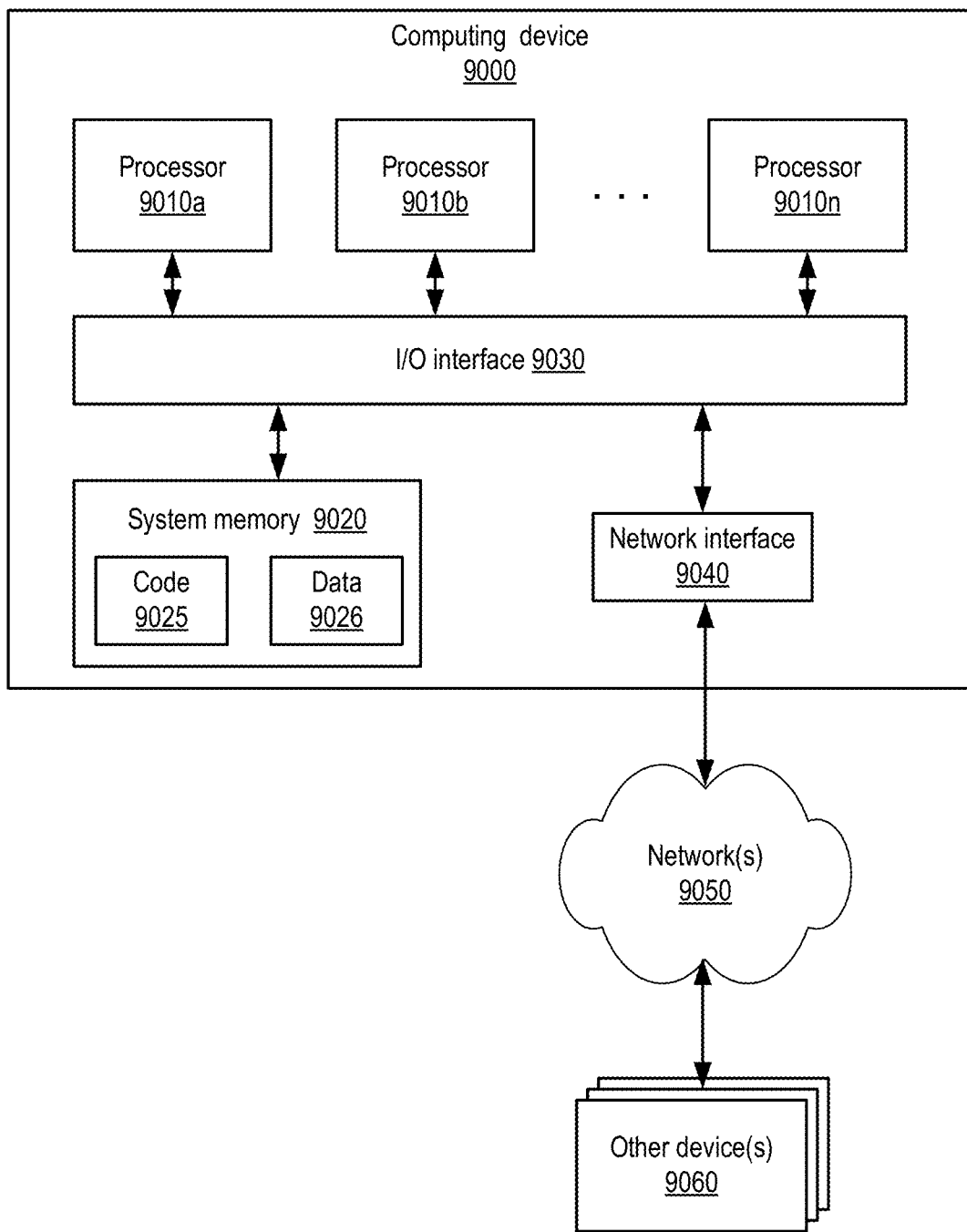
FIG. 9 is a block diagram illustrating an example computing device that may be used in at least some embodiments.

In at least some embodiments, a server that implements the types of techniques described herein (e.g., various functions of an analytics service, a monitoring service and/or other services of a provider network), may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 8. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices;
   wherein the one or more computing devices include instructions that upon execution on or across the one or more computing devices cause the one or more computing devices to:
      obtain a plurality of metrics metadata records, comprising at least some metrics metadata records which include one or more text tokens pertaining to custom application-level metrics for which anomaly detection has been requested by administrators of one or more internally-developed applications of a provider network;
      train, using at least some metrics metadata records of the plurality of metrics metadata records, a machine learning model to predict an anomaly detection relevance score for an input record comprising (a) a name of a metric and (b) a statistic associated with the metric, wherein the machine learning model comprises a text analyzer to which representations of the one or more text tokens are provided as input;
      store a trained version of the machine learning model;
      identify a plurality of candidate metrics for an application executable using one or more resources of the provider network;
      using a trained version of the machine learning model, determine respective anomaly detection relevance scores for the plurality of candidate metrics;
      select, based on the respective anomaly detection relevance scores that are above a threshold score, a subset of the plurality of candidate metrics;
      initiate collection of one or more statistics of the subset of the metrics pertaining to execution of the application using the one or more resources of the provider network, including a particular statistic of a particular metric of the subset, wherein the collection is initiated without receiving a request specifying the particular statistic;
      detect, based at least in part on collected values of the one or more statistics, one or more examples of anomalous values of the particular metric; and
      provide an indication, via one or more programmatic interfaces, of the one or more examples to one or more destinations.

2. The system as recited in claim 1, wherein the machine learning model comprises one or more neural networks.

3. The system as recited in claim 1, wherein the machine learning model is associated with a first problem domain, and wherein the one or more computing devices include further instructions that upon execution on or across the one or more computing devices further cause the one or more computing devices to:
   train an additional machine learning model associated with a second problem domain, using an additional plurality of metadata records pertaining to the second problem domain; and
   utilize a trained version of the additional machine learning model to identify one or more other statistics of one or more other metrics to detect anomalies pertaining to the second problem domain.

4. The system as recited in claim 1, wherein at least one metrics metadata record of the plurality of metrics metadata records indicates a user-defined anomaly specification.

5. The system as recited in claim 1, wherein the one or more computing devices include further instructions that upon execution on or across the one or more computing devices further cause the one or more computing devices to:
   obtain a representation of a post-mortem analysis of a problem event; and
   utilize at least a portion of the representation of the post-mortem analysis to train the machine learning model.

6. A computer-implemented method, comprising:
   obtaining a plurality of metrics metadata records, comprising at least some metrics metadata records which indicate metrics for which anomaly analysis has been performed;
   training, using a training data set which comprises at least some metrics metadata records of the plurality of metrics metadata records, a machine learning model to predict an anomaly analysis relevance score for an input record comprising (a) a name of a metric and (b) a statistic associated with the metric; and
   identifying a plurality of candidate metrics that is to be used for an application executable using one or more resources of the provider network;
   using a trained version of the machine learning model, determining respective anomaly detection relevance scores for the plurality of candidate metrics;
   selecting, based on the respective anomaly detection relevance scores, a subset of the plurality of candidate metrics;
   initiating collection of a particular statistic of a particular metric of the subset of the metric pertaining to execution of the application using the one or more resources of the provider network, wherein the collection is initiated based at least in part on an anomaly analysis relevance score obtained for the particular metric and the particular statistic from the trained version of the machine learning model.

7. The computer-implemented method as recited in claim 6, wherein at least one metrics metadata record of the plurality of metrics metadata records is obtained from a monitoring service of a provider network.

8. The computer-implemented method as recited in claim 6, wherein at least one metrics metadata record of the plurality of metrics metadata records includes a user-defined anomaly specification.

9. The computer-implemented method as recited in claim 6, wherein at least one metrics metadata record of the plurality of metrics metadata records indicates a number of times that an anomaly was detected with respect to a metric.

10. The computer-implemented method as recited in claim 6, wherein the training data set comprises a representation of at least a portion of a post-mortem analysis of a problem event.

11. The computer-implemented method as recited in claim 6, wherein the particular statistic comprises one or more of: (a) a percentile, (b) an average, (c) a minimum, (d) a maximum, (e) a sum, (f) a count of occurrence of a particular value or (g) a custom statistic whose definition is supplied via a programmatic interface.

12. The computer-implemented method as recited in claim 6, further comprising:
   causing an indication of one or more statistics to be presented via a programmatic interface, wherein collection of the one or more statistics was initiated automatically based on respective anomaly detection relevance scores obtained using the trained version of the machine learning model.

13. The computer-implemented method as recited in claim 6, further comprising:
   automatically generating an anomaly specification with respect to the particular metric; and
   detecting one or more anomalous values of the particular metric based at least in part on the anomaly specification.

14. The computer-implemented method as recited in claim 6, further comprising:
   verifying, based at least on part on input received via one or more programmatic interfaces, that an entity on whose behalf a particular metrics metadata record of the plurality of metrics metadata records was created has provided permission to access to the particular metrics metadata record.

15. The computer-implemented method as recited in claim 6, wherein said training the machine learning model comprises one or more of: (a) an unsupervised phase, (b) a semi-supervised phase, or (c) a supervised phase.

16. One or more non-transitory computer-accessible storage media storing program instructions that when executed on or across one or more processors cause the one or more processors to:
   obtain a plurality of metrics records, comprising at least some metrics records which indicate metrics for which anomaly analysis has been performed;
   train, using a training data set which comprises at least some metrics records of the plurality of metrics records, a machine learning model to predict an anomaly analysis relevance score for an input record comprising a name of a metric; and
   identify a plurality of candidate metrics that is to be used for an application executable using one or more resources of the provider network;
   using a trained version of the machine learning model, determine respective anomaly detection relevance scores for the plurality of candidate metrics;
   select, based on the respective anomaly detection relevance scores, a subset of the plurality of candidate metrics;
   initiate collection of a particular statistic of a particular metric of the subset of the metric pertaining to execution of the application using the one or more resources of the provider network, wherein the collection is initiated based at least in part on an anomaly detection relevance score obtained for the particular metric from the trained version of the machine learning model.

17. The one or more non-transitory computer-accessible storage media as recited in claim 16, wherein a metrics record of the plurality of metrics records indicates one or more of: (a) a metrics namespace, (b) one or more user-defined metric attributes, (c) a metric collection frequency or (d) a statistic computed with respect to the metric.

18. The one or more non-transitory computer-accessible storage media as recited in claim 16, wherein the application utilizes respective resources of a plurality of services of a provider network, and wherein the particular metric represents one or more quantitative properties associated with (a) a first operation performed using at least one resource of a first service of the plurality of services and (b) a second operation performed using at least one resource of a second service of the provider network.

19. The one or more non-transitory computer-accessible storage media as recited in claim 16, storing further program instructions that when executed on or across one or more processors further cause the one or more processors to:
   cause an indication of one or more statistics to be presented via a programmatic interface, wherein collection of the one or more statistics was initiated automatically based on respective anomaly analysis relevance scores obtained using the trained version of the machine learning model.

20. The one or more non-transitory computer-accessible storage media as recited in claim 16, storing further program instructions that when executed on or across one or more processors further cause the one or more processors to:
   generate the training data set based at least in part on analysis of one or more of: (a) a representation of a dashboard configured on behalf of a client of a provider network, or (b) a representation of at least one alarm configured on behalf of a client of a provider network.

* * * * *